July 20, 1965   H. B. SHARP   3,196,202
HOUSING FOR PROTECTIVE GEAR FOR OVERHEAD ELECTRICAL CONDUCTORS
Filed Aug. 25, 1961   3 Sheets-Sheet 1

Inventor
Harold Bremner Sharp
By
Burns, Doane, Benedict, Swecker & Mathis
Attorneys

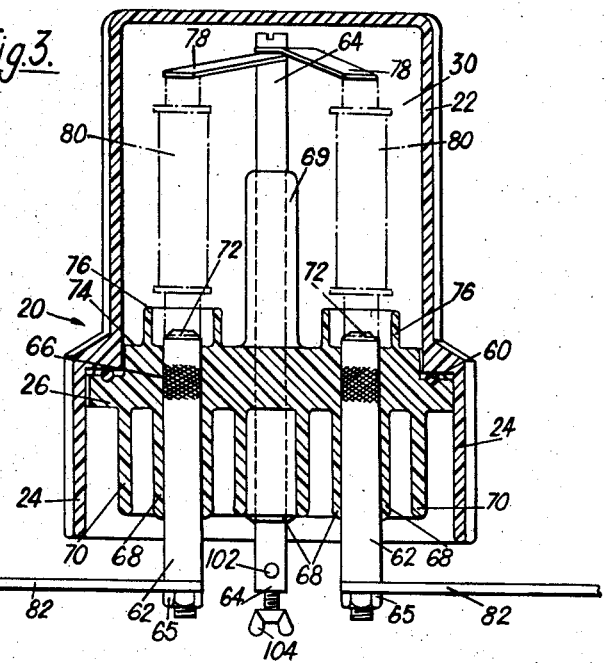
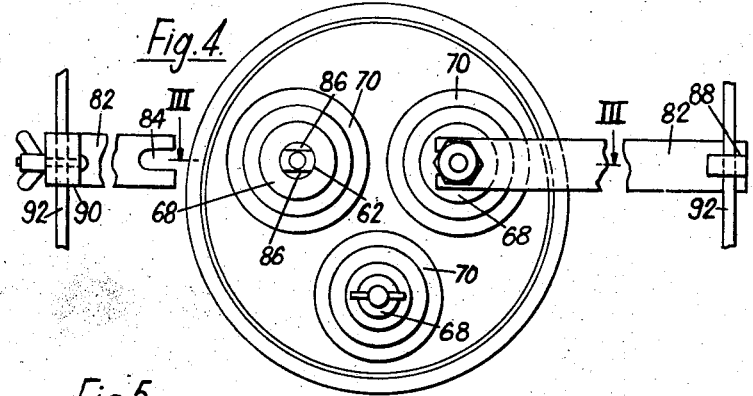
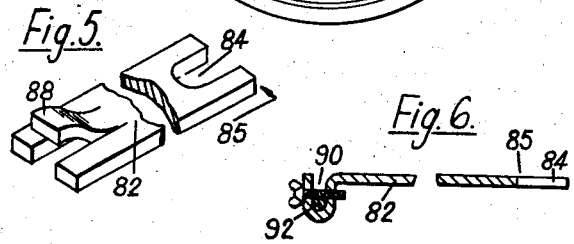
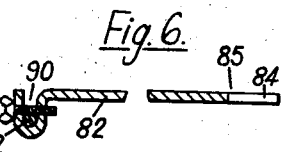

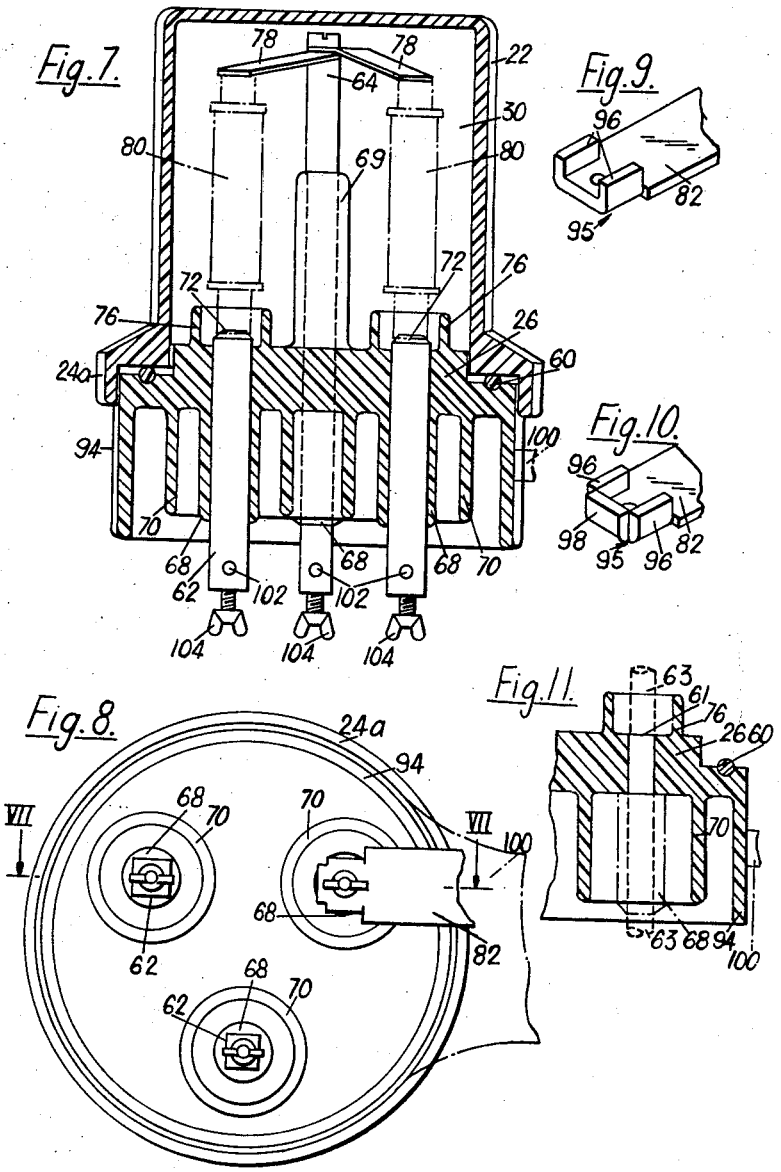

3,196,202
HOUSING FOR PROTECTIVE GEAR FOR OVER-
HEAD ELECTRICAL CONDUCTORS
Harold Bremner Sharp, 455 Main Road, Escombe,
Natal, Republic of South Africa
Filed Aug. 25, 1961, Ser. No. 133,834
11 Claims. (Cl. 174—44)

This invention relates to a device for mounting auxiliary or protective electrical gear for overhead tele-communications and power lines.

It is an object of this invention to provide a device for supporting such gear close to the overhead line conductors, and having good insulating properties, even under adverse weather conditions.

According to the invention an overhead line equipment mounting device comprises a platform of electrical insulating material, a cover having engaging means adapted to engage with the platform there being defined between the platform and the cover a space within which overhead line equipment or protective gear is receivable, a skirt fast with the cover or platform and depending below the platform, connecting means for providing electrical conducting paths through the platform into and out of the defined space and mounting means for mounting the cover and platform assembly close to overhead line conductors, the skirt being adapted to protect the underside of the platform against rain reaching the connecting means.

The skirt may be fast with the platform or with the cover. The platform may be of a mouldable synthetic plastic material and then the connecting means comprises conveniently conductor posts embedded in the platform, the posts having outer connecting means below the platform for connection to overhead line conductors, and inner connecting means above the platform and within the space for connection to the overhead line equipment receivable within the defined space. There may be provided fast with the underside of the platform, and around the posts, conductor skirts depending below the platform. As a further feature of the invention there may be provided upstanding lips fast with and proud of the upper surface of the platform and around the conductor posts.

As an alternative, the connecting means may include apertures through the platform the apertures being adapted to receive conductors passing therethrough. If desired, the platform may be provided around the apertures with upstanding lips fast with and proud of the platform upper surface and skirts fast with and depending from the platform lower surface.

The engagement between the cover and the platform, may be screw means but it may also be by bayonet type engagement means, comprising lugs or prongs and co-acting recesses. The cover and platform mate along two faces and preferably a gasket is provided between the mating faces to ensure a sealed joint.

Further features of the invention will become apparent from the following description of specific embodiments with reference to the accompanying drawings.

In the drawings:

FIGURE 3 shows a sectional side elevation of another embodiment of the device at III—III in FIGURE 4;

FIGURE 4 shows an underside plan view corresponding to FIGURE 3;

FIGURE 5 shows a three dimensional view of one type of mounting bar;

FIGURE 6 shows a sectional side elevation of another type of mounting bar;

FIGURE 7 shows a sectional side elevation of another embodiment of the invention, as at VII—VII in FIGURE 8;

FIGURE 8 shows an underside plan view corresponding to FIGURE 7;

FIGURE 9 shows a three dimensional view of a mounting bar for a square section conductor post;

FIGURE 10 shows a three dimensional view of another type of mounting bar for a square section conductor post; and FIGURE 11 shows a fragmentary section of an alternative arrangement of platform.

Figure 1:
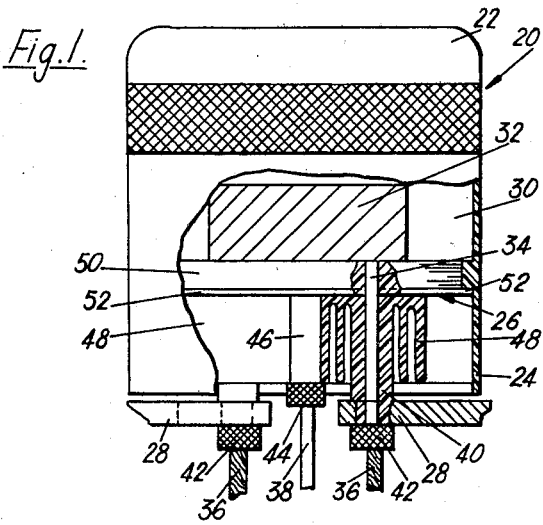
FIGURE 1 shows a part sectional side elevation of one embodiment of the device.
Figure 2:
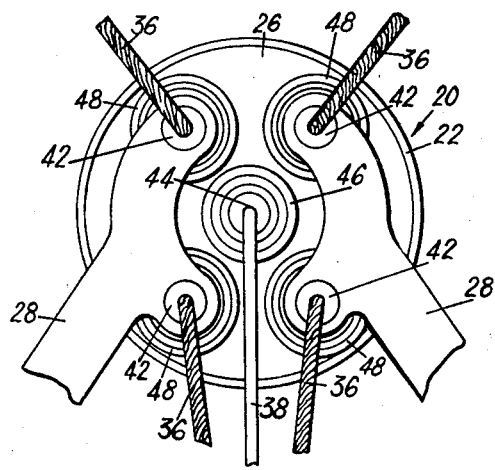
FIGURE 2 shows a part underside plan view corresponding to FIGURE 1.

Referring to the drawings, reference numeral 20 refers generally to the device comprised of cover 22 having depending skirt 24, platform 26 of an electrical insulating material, and arms 28 adapted to support the device. Between the cover and the platform there is defined a space 30 adapted to receive overhead line equipment or protective gear 32. Conducting means providing an electrical conducting path into the space 30 is provided through the platform by apertures 34 adapted to receive conductors 36. A similar centrally disposed aperture is provided through the platform to receive earth conductor 38. The apertures are coaxial with nipples 40 which are screwed at their lower ends to receive ring nuts 42 around conductors 36. Similarly earth conductor 38 has ring nut 44 coacting with an earth nipple hidden behind skirt 46 around the earth nipple. Similarly there are provided depending skirts 48 around the nipples 40 and depending from the lower surface of the platform. The cover 22 is adapted to screw onto the platform 26 via screw thread 50, the cover screwing up against a shoulder 52 provided on the platform.

The nipples 40 are receivable into sockets provided in the arms 28 the nipples being drawn firmly into the sockets by means of ring nuts 42, to bed the nipples firmly into the sockets. The arms 28 have means at their ends for mounting near to overhead lines, for support.

Referring to FIGURE 3, reference numeral 20 again refers generally to the device, comprised of cover 22 having depending skirt 24, and engaging bayonet fashion with platform 26, to effect a sealed connection between platform and cover via resilient ring gasket 60.

The platform is of a mouldable synthetic plastic material having good di-electric properties and within which is embedded conductor posts 62 and earth conductor post 64. These posts 62 and 64 may have any convenient section such as round or square and when they are round then they are conveniently provided with knurling 66 to ensure good keying between the conductor posts and the platform. The conductor pasts 62 and 64 are embedded within nipples 68 around which are provided depending skirts 70. The conductor posts 62 have upper ends 72 projecting above the upper surface 74 of the platform, and upstanding lips 76 integral with the upper surface of the platform are provided around the upper ends 72 of the conductor posts 62. Resilient conductor arms in the form of leaf spring conductors 78 are connected to earth conductor post 64 and protective devices 80 are adapted to engage between leaf springs 78 and the upper ends 72 of conductors posts 62.

Mounting arms 82 are provided at the lower ends of the conductor posts 62 and have open ended slots 84 at their inner ends 85 adapted to engage with flats 86 provided on the outer ends of conductor posts 62 and screwed down by nuts 65. The opposing ends of the mounting arms may be provided with notches 88 or loops 90 adapted to receive and engage with overhead line conductors 92. If desired, after mounting, the joints between the overhead line conductors 92 and the notches 88 or loops 90 of the mounting arms may be soldered to ensure an effective electrical bond and permanent support.

Referring to FIGURE 7 the embodiment there shown is very much the same as that shown in FIGURE 3 except that instead of the long depending skirt 24 being provided fast with the cover 22, it is provided now only as a short depending skirt 24a. Instead there is provided a skirt 94 depending from the lower surface of the platform and integral therewith. This skirt is adapted to protect the undersurface of the platform the conductor posts 62 and the earth conductor post 64 against rain. The outer ends 95 of mounting arms 82 may be provided with a pair of flanges 96 with or without end flange 98 to engage with the lower ends of the conductor posts 62 and the earth conductor post 64.

Where mounting arms in the form of bars 82 cannot be used and where flexible conductors are used then there may be provided an arm 100 moulded integrally with the platform and skirt 94. When the flexible conductors are used instead of rigid mounting arms 82 then holes 102 may be provided in the ends of conductor posts 62 and earth conductor post 64, good electrical contact being established by the wingscrews 104 screwing the conductors hard up against the walls of holes 102. Alternatively, instead of embedded conductor posts 62, referring to FIGURE 11 there may be provided apertures 61 through the platform 26 and coaxial with skirt 70. Nipples 68 may be retained as skirts if desired. Flexible conductors 63 are adapted to pass through the apertures 61.

It will be clear that in use, on the underside of the platform there is a long leakage path between the conductor posts as between themselves and as between them and the earth conductor post 64. The protective devices 80 can be replaced, even in wet weather, because of the long leakage path provided within the space 30 between the upper ends 72 of the conductor posts 62 provided by the upstanding lips 76, and the pillar 69 within which the earth conductor post 64 is embedded, i.e. scattered rain drops on the upper surface of the platform while the cover is off cannot establish a continuous leakage path.

I claim:

1. An overhead line equipment mounting device comprising a platform of electrical insulating material, a cover, means for securing the cover and the platform together, there being defined between the platform and the cover a space within which overhead line equipment such as protective gear is receivable, a plurality of elongated nipples extending outwardly from the platform, conductor means extending through said nipples and through the platform from bottom to top and into and out of the defined space, a plurality of continuous skirts extending outwardly from the platform, each skirt extending around and along one of the nipples individually and forming an annular space therebetween, and mounting means for mounting the cover and platform assembly close to overhead line conductors, the skirts being adapted to guard against rain reaching the connecting means from below and thus to prevent an electrical leakage path of low resistance being established on the undersurface of the platform between adjacent connecting means.

2. An overhead line equipment mounting device comprising a platform of moldable electrical insulating material, a cover, means for securing the cover and the platform together, there being defined between the platform and the cover a space within which overhead line equipment such as protective gear is receivable, connecting means comprising nipples integral with the underside of platform and depending below it, and conductor posts extending through the nipples and the platform for providing electrical conducting paths through the platform into and out of the defined space, continuous depending skirts fast with the underside of the platform and around the nipples individually and spaced away from them, the posts having outer connecting means below the platform and nipples for connection to overhead lines, the space between said skirts and their respective nipples extending substantially along the nipple and having a length at least as the diameter of the conductor posts, and mounting means for mounting the cover and platform assembly close to overhead line conductors, the skirts being adapted to guard against rain reaching the connecting means from below and thus to prevent an electrical leakage path of low resistance being established on the undersurface of the platform between adjacent connecting means.

3. A device according to claim 2 in which there are provided continuous upstanding lips around the conductor posts individually and spaced away from them and being fast with the platform and projecting above the level of the upper ends of the posts and of the upper surface of the platform.

4. An overhead line equipment mounting device comprising a platform of moldable electrical insulating material, a cover, means for securing the cover and the platform together, there being defined between the platform and the cover a space within which overhead line equipment such as protective gear is receivable, connecting means comprising nipples integral with the underside of the platform and depending therefrom, and conductor posts extending through the platform and the nipples for providing electrical conducting paths through the platform into and out of the defined space, continuous depending skirts fast with the underside of the platform and around the nipples individually and spaced away from them, the posts having outer connecting means below the platform and nipples for connection to overhead lines, said outer connecting means being provided with screw means, and means for mounting the cover and platform assembly close to overhead line conductors, said mounting means including electrically conducting bars having inner ends mating with the screw means of the outer connecting means, the bars having outer ends having means for engaging with overhead line conductors to support the device and to provide electrical connections between the conductors and the conductor posts, whereby the skirts guard against rain reaching the connecting means from below and thus prevent an electrical leakage path of low resistance being established on the undersurface of the platform between adjacent connecting means.

5. An overhead line equipment mounting device comprising a platform of moldable electrical insulating material, a cover, means for securing the cover and the platform together, there being defined between the platform and the cover a space within which overhead line equipment such as protective gear is receivable, connecting means comprising nipples integral with the underside of the platform and depending therefrom, and conductor posts extending through the platform and the nipples for providing electrical conducting paths through the platform into and out of the defined space, continuous depending skirts fast with the underside of the platform and around the nipples individually and spaced away from them, the posts having outer connecting means below the platform and nipples for connection to overhead lines, one of said conductor posts being an earth post projecting above the platform to a greater extent than at least one other post and having an end projecting below the platform, and means for mounting the cover and platform assembly close to overhead line conductors, said mounting means including a bar having means at one end for connection below the platform to the lower projecting end of the earth post and having at the other end means for connecting it to an overhead line support member for support and for electrical earth connection, and at least one resilient conductor arm provided fast with the upper end of the earth post above the platform and extending transversely over the upper end of the other conductor post; whereby overhead line equipment receivable in the defined space may be maintained in position by the resilient conductor arm and in electrical connection with the upper end of the other conductor post and with the resilient conductor arm.

6. An overhead line equipment mounting device comprising a platform of electrical insulating material, a cover, means for securing the cover and the platform together, there being defined between the platform and the cover a space within which overhead line equipment such as protective gear is receivable, a plurality of elongated nipples extending outwardly from the platform, conductor means extending through said nipples and through the platform from bottom to top into and out of the defined space, apertures extending axially through the nipples and through the platform, a plurality of continuous skirts extending outwardly from the platform, each skirt extending around and along one of the nipples individually and forming an annular space therebetween, said nipples having screw threads thereon adjacent the ends of the nipples, and means for mounting the cover and platform assembly close to overhead line condictors, said mounting means including at least one mounting arm having sockets, and recessed portions extending inwardly of the ends of the nipples and received within sockets of the mounting arm, and ring nuts engaging with the screw-threaded ends of the nipples to draw the recessed portions firmly into the sockets, whereby the skirts guard against rain reaching the connecting means from below and thus prevent an electrical leakage path of low resistance being established on the undersurface of the platform between adjacent connecting means.

7. A device according to claim 6 wherein said platform has continuous upstanding lips on the side of the platform opposite the nipples, said lips extending individually around and spaced from said apertures.

8. An overhead line equipment mounting device comprising a platform of electrical insulating material, a cover having engaging means engaging sealingly with the platform there being defined between the platform and the cover a space within which overhead line equipment such as protective gear is receivable, connecting means including nipples integral with the underside of the platform and depending below it and conductor means extending through each nipple and through the platform for providing electrical conducting paths through the platform from bottom to top and into and out of the defined space, continuous depending skirts integral with the underside of the platform and around the nipples individually and spaced away from the nipples, said cover having a continuous skirt extending around and depending below the platform and below the skirts around the nipples, and mounting means for mounting the cover and platform assembly close to overhead line conductors, the skirts being adapted to guard against rain reaching the connecting means from below and thus to prevent an electrical leakage path of low resistance being established on the undersurface of the platform between adjacent connecting means.

9. An overhead line equipment mounting device comprising a platform of electrical insulating material, a cover having engaging means engaging sealingly with the platform there being defined between the platform and the cover a space within which overhead line equipment such as protective gear is receivable, connecting means including nipples integral with the underside of the platform and depending below it and conductor means extending through each nipple and through the platform for providing electrical conducting paths through the platform from bottom to top and into and out of the defined space, continuous depending skirts integral with the underside of the platform and around the nipples individually and spaced away from the nipples, said platform having a continuous skirt extending around and integral with it and depending below the platform and below the skirts around the nipples, and mounting means for mounting the cover and platform assembly close to overhead line conductors, the skirts being adapted to guard against rain reaching the connecting means from below and thus to prevent an electrical leakage path of low resistance being established on the undersurface of the platform between adjacent connecting means.

10. An overhead line equipment mounting device comprising a platform, a cover, means for securing the cover to the platform, said cover extending over the platform and forming a chamber therebetween for said equipment, a tubular nipple having one end secured to the platform, conductor means extending through the nipple and through the platform, and a tubular skirt having one end secured to the platform, said skirt being coaxial and substantially coextensive with said tubual nipple, and spaced radially from said nipple, said skirt and said nipple forming an annular space extending substantially the entire length of the nipple, whereby the skirt prevents an electrical leakage path of low resistance being established on the undersurface of the platform.

11. An overhead line equipment mounting device comprising a platform, a cover, means for securing the cover to the platform, said cover extending over the platform and forming a chamber therebetween for said equipment, a pair of tubular nipples, each of said nipples having one end secured to the platform, individual conductor means extending through each of said nipples and through the platform, and tubular skirts having one end secured to the platform, at least one of said skirts individually surrounding one of said nipples in coaxial relation and substantially coextensive therewith, said skirts being spaced from each other, whereby the skirts prevent an electrical leakage path of low resistance being established between said individual conductor means.

References Cited by the Examiner

UNITED STATES PATENTS

| 1,946,265 | 2/34 | Baguley | 174—60 |
| 2,338,179 | 1/44 | Halbrook et al. | 174—60 X |

FOREIGN PATENTS

| 82,251 | 12/20 | Austria. |
| 39,198 | 7/31 | France. (Third addition to No. 651,314.) |
| 651,314 | 10/28 | France. |
| 552,513 | 4/43 | Great Britain. |
| 605,891 | 8/48 | Great Britain. |
| 638,359 | 6/50 | Great Britain. |

OTHER REFERENCES

Langer: German Printed Application 1,021,046, Dec. 19, 1957.

Krone et al.: German Printed Application 1,058,120, May 27, 1959.

LARAMIE E. ASKIN, *Primary Examiner.*

JOHN P. WILDMAN, *Examiner.*